US005617988A

United States Patent [19]
Willemen

[11] Patent Number: 5,617,988
[45] Date of Patent: Apr. 8, 1997

[54] DEVICE FOR MEASURING THE HEIGHT OF A SOLDER WAVE

[75] Inventor: Lambertus P. C. Willemen, Dorst, Netherlands

[73] Assignee: Soltec B.V., Oosterhout, Netherlands

[21] Appl. No.: 608,544

[22] Filed: Feb. 28, 1996

[30] Foreign Application Priority Data

Mar. 3, 1995 [NL] Netherlands ............................ 9500425

[51] Int. Cl.$^6$ ................................ H05K 3/34; B23K 3/06
[52] U.S. Cl. ............................... 228/37; 228/56.5; 222/55
[58] Field of Search ................................ 228/8, 37, 56.5, 228/102, 103, 260; 73/49.5; 222/591, 594, 55

[56] References Cited

U.S. PATENT DOCUMENTS 4,889,273  12/1989  Kondo ........................................ 228/8

FOREIGN PATENT DOCUMENTS 2682903  4/1993  France .

*Primary Examiner*—Samuel M. Heinrich
*Attorney, Agent, or Firm*—Banner & Witcoff, Ltd.

[57] ABSTRACT

The invention relates to a device for measuring the height of a solder wave in a soldering apparatus which comprises a solder bath and which is provided with at least one solder tower for generating a solder wave and a pump connected to the solder tower, wherein the measuring device comprises: means for measuring the liquid pressure in the connection between the pump and the solder tower. As a result of these steps it is possible to measure accurately the pressure of the solder moving out of the pump to the solder tower. This pressure is in any case a good measure for the height of the solder wave. According to a first preferred embodiment the means for measuring the liquid pressure comprise a measuring vessel joined to the connection between pump and tower and communicating at its top with the atmosphere, the upper edge of which vessel is located higher than the outflow opening of the solder tower.

14 Claims, 3 Drawing Sheets

DEVICE FOR MEASURING THE HEIGHT OF A SOLDER WAVE

The invention relates to a device for measuring the height of a solder wave in a soldering apparatus which comprises a solder bath and which is provided with at least one solder tower for generating a solder wave and a pump connected to the solder tower.

Such soldering apparatus are generally known.

Generally the objects for soldering, for instance printed circuit boards, are carried over the soldering vessel, wherein they are subjected on their underside to the activity of the solder wave leaving the solder tower. The components of the objects for soldering, for instance the connecting wires or lips of components fixed to the printed circuit board, are herein fixedly soldered to the board by the solder wave. It is of course important here that the soldering process takes place only on the underside of the object for soldering since the upper part of the object for soldering, for instance the printed circuit board and the components fixed thereon, suffers damage if it comes into contact with molten solder.

It is further of importance that the solder wave rises high enough firstly to make contact with the underside of the object for soldering and secondly to strike the underside of the object for soldering with sufficient force so that a good soldered connection is also obtained in poorly accessible places. Envisaged here for instance are the connecting lips of so-called chip or surface mounting components located at a very short distance from the conductor paths of the printed circuit boards.

It is thus of the greatest importance that the height of the solder wave generated by a solder tower be maintained at the correct value.

In apparatus known heretofore the solder wave is adjusted by eye, wherein the obtained height is not always optimal.

The object of the present invention is to provide a device with which the height of the solder wave leaving the solder tower is always as accurate as possible and wherein the height is moreover reproducible.

This object is achieved in that the measuring device comprises: means for measuring the liquid pressure in the connection between the pump and the solder tower.

As a result of these steps it is possible to measure accurately the pressure of the solder moving out of the pump to the solder tower. This pressure is in any case a good measure for the height of the solder wave.

According to a first preferred embodiment the means for measuring the liquid pressure comprise a measuring vessel joined to the connection between pump and tower and communicating at its top with the atmosphere, the upper edge of which vessel is located higher than the outflow opening of the solder tower.

By providing for instance the inside of the measuring vessel with a calibration a reproducible liquid level, and thus a reproducible pressure prevailing in the tower, can hereby be indicated. It will be apparent that, when the properties of the tower are unchanged (for instance unchanged slot width), this will result in reproducibility of the height of the wave leaving the tower.

The invention will be elucidated hereinbelow with reference to the annexed figures, in which.

Figure 1:
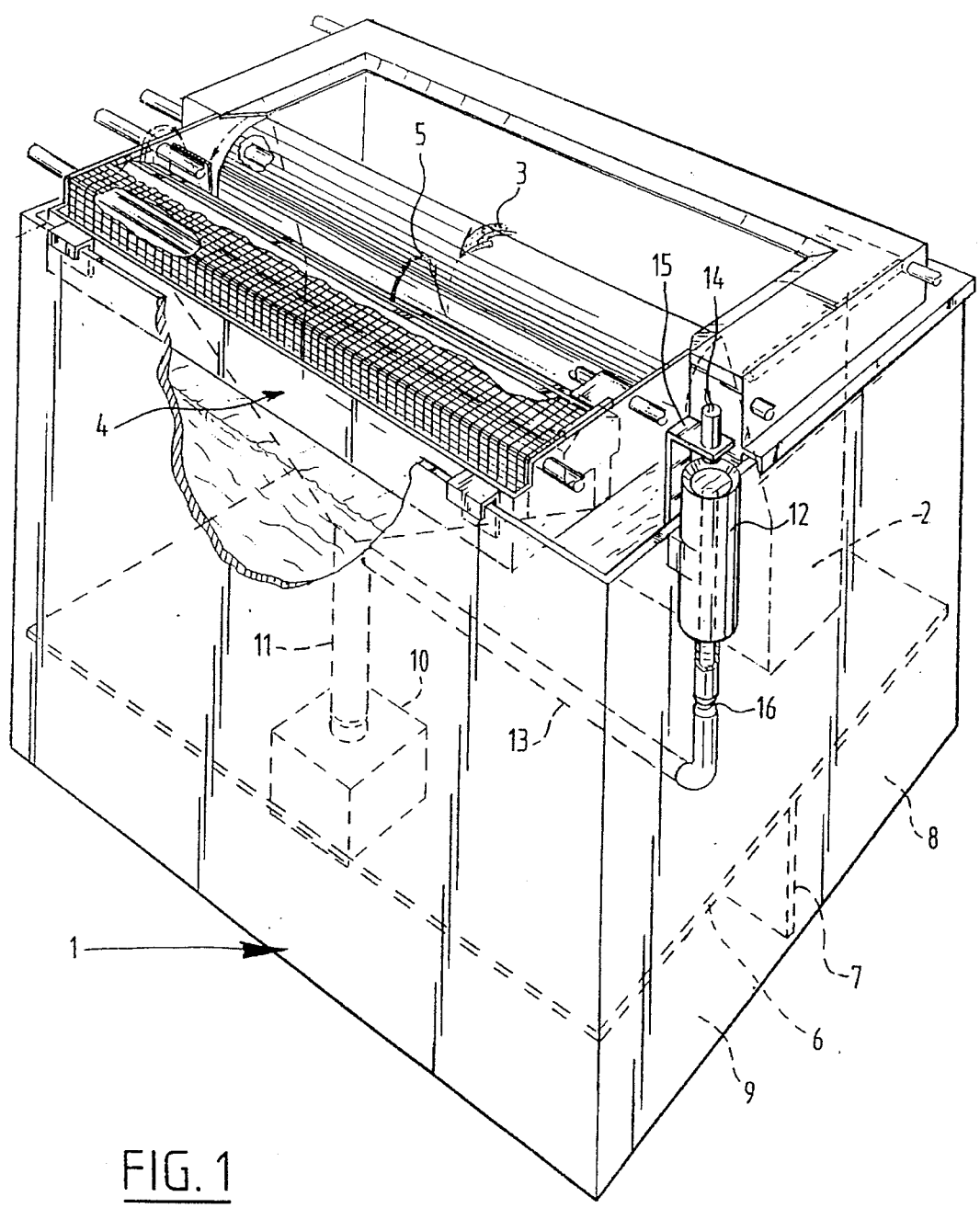
FIG. 1 shows a partly broken away perspective view of a solder vessel provided with a solder tower, wherein a device according to the invention is arranged.

Shown in FIG. 1 is a solder vessel 1 in which is arranged a solder tower 2 for generating a solder wave 3 and in which is also arranged a chip solder tower 4 adapted to generate a chip solder wave 5. For supply of molten solder to solder tower 2 a base plate 6 is arranged in solder vessel 2 which is joined to the bottom of solder vessel 1 by means of a vertical plate 7. In the thus resulting space 8 is arranged a pump (not shown in the drawing) which drives the molten solder upward to solder tower 2.

In similar manner a pump 10 is placed in the other space 9 enclosed by the horizontal plate 6, vertical plate 7 and the bottom and side walls of solder vessel 1, which pump is connected by means of a pipe 11 to the chip wave tower 4. The pump 10 pumps molten solder up from vessel 1 and guides it upward through pipe 11 towards the chip wave solder tower 4, thus creating chip wave 5.

In the present embodiment the chip wave solder tower 4 is provided with a device for measuring the height of the chip wave 5 generated by this tower. This device is formed by a measuring vessel 12 which is connected to pipe 11 by means of a pipe 13. On its upper part the measuring vessel 12 tapers outward towards the top so that a comparatively large surface area of the liquid level is visible.

It is of course possible, for instance by means of arranging a calibration, to determine precisely the height of the liquid level. On the basis thereof the capacity of the pump 10 can be adjusted. The calibration can be arranged in the interior of the measuring vessel, although it is also possible to embody the measuring vessel in transparent material, for instance quartz glass, and provide it with a calibration, thus facilitating reading.

It is of course possible to determine the height of the liquid level in other manner, for instance electronically. For this purpose an approach detector 14 is placed above the measuring vessel 12 using a bracket 15.

By connecting the output terminals of the approach detector 14 to an indicator measuring instrument, the height of the liquid level, and therewith the height of the chip wave, can be determined with a high degree of accuracy. It is of course also possible to use the output signal of the approach detector for automatic control of the height of the chip wave. However, with regard to the slowness of the whole system, this is not simple; it is pointed out that solder wave, and therefore also the chip wave, is generally only switched on when an object for soldering, for instance a printed circuit board, is present above the chip solder wave tower, and that when the printed circuit board for soldering has left the soldering path the chip wave is switched off again. This step serves to prevent the chip wave spraying over the edge of the object for soldering and causing damage on the upper side.

Finally, a narrowed portion 16 is arranged in connecting pipe 13 to damp rapid fluctuations in the pressure generated by the pump before these are transmitted to the wave height measuring system.

Figure 2:
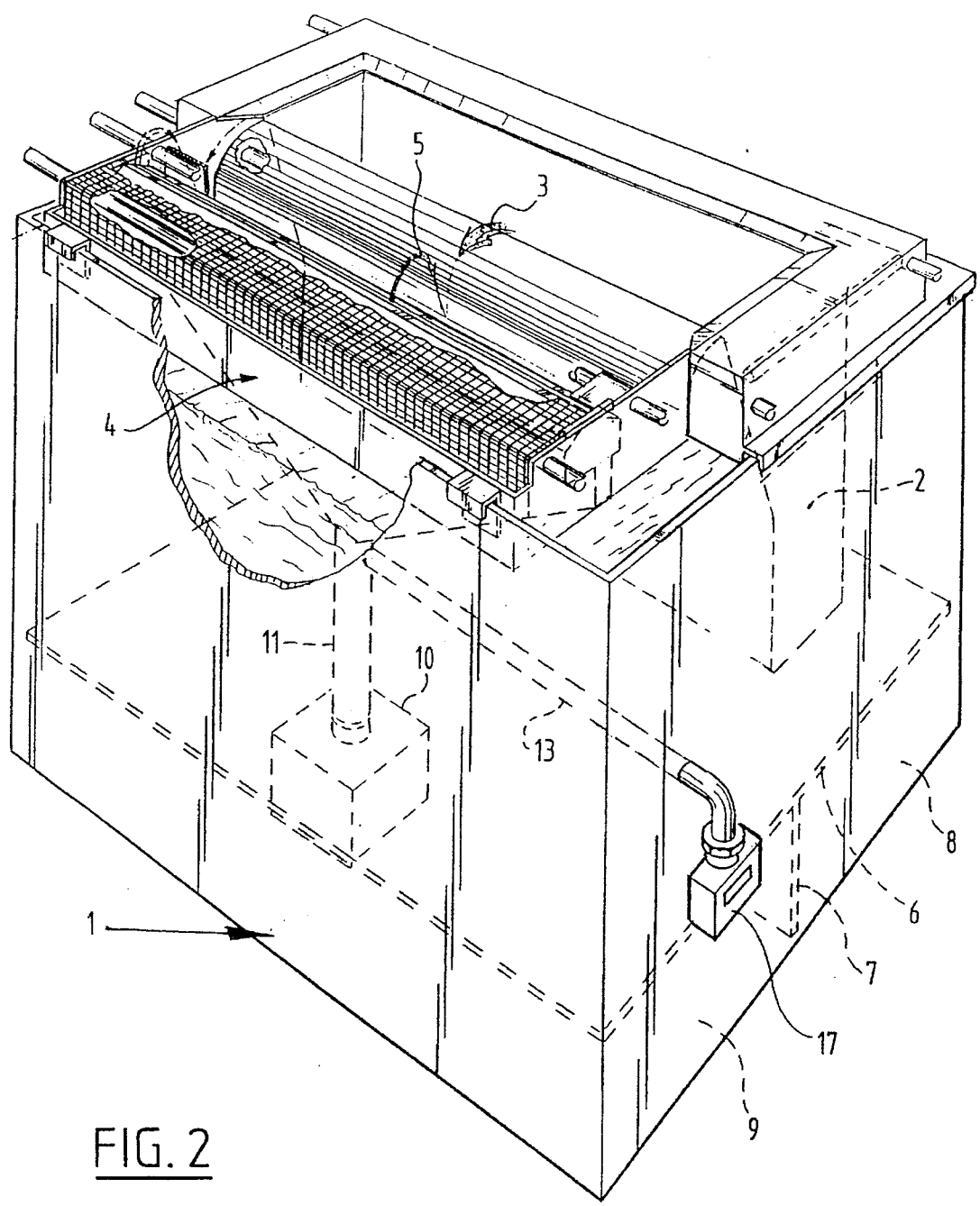
FIG. 2 shows a view corresponding with FIG. 1 wherein a different type of measuring device for measuring the height of the solder wave is arranged.

FIG. 2 shows a similar device. The device shown in FIG. 2 differs only in the nature of the pressure detector. The embodiment shown in FIG. 2 has a commercially available pressure detector 17 which is connected to pipe 11 by means of pipe 13. The detector is provided with an output terminal (not shown) which can be connected to an indicator measuring instrument, possibly in digital form, or which can be connected to a control circuit for regulating the capacity of the pump.

Figure 3:
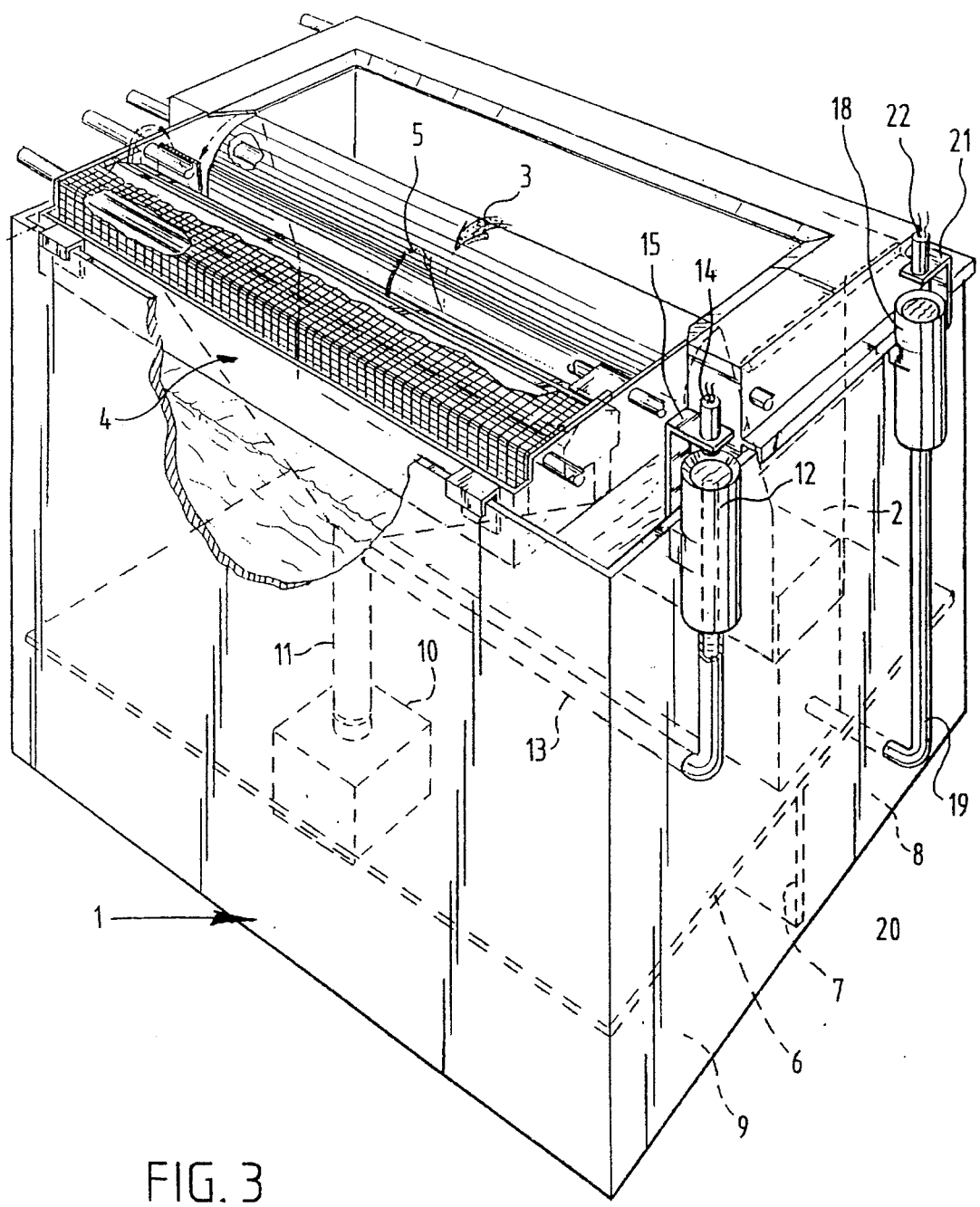
FIG. 3 shows a partly broken away perspective view of a solder vessel in which two solder towers are arranged, each provided with a measuring device according to the invention.

Finally, FIG. 3 shows an embodiment wherein a wave height measuring device is arranged for both solder towers. That is, the embodiment shown in FIG. 3 corresponds with the embodiment shown in FIG. 1, wherein however a second measuring vessel 18 is arranged which is connected by means of pipe 19 to the pump 20 leading to solder tower 2. Further also arranged in this embodiment is a bracket 21 on which is mounted an approach detector 22. The signals coming from both approach detectors 14,22 can be read on an instrument suitable for this purpose. It is finally noted that in general it is important, particularly in the case of chip waves, to adjust the wave height properly. The dimensions of the components to be fixedly soldered by the chip wave contribute hereto. Furthermore, the height of a chip wave is more difficult to determine with the naked eye.

I claim:

1. Device for measuring the height of a solder wave in a soldering apparatus which includes a solder bath and which is provided with at least one solder tower for generating a solder wave and a pump connected to the solder tower, characterized in that the measuring device comprises: means for measuring the liquid pressure in the connection between the pump and the solder tower.

2. Device as claimed in claim 1, characterized in that the means for measuring the liquid pressure comprise a measuring vessel joined to the connection between pump and tower and communicating at its top with the atmosphere, the upper edge of which vessel is located higher than the outflow opening of the solder tower.

3. Device as claimed in claim 2, characterized in that the measuring vessel is widened at its upper end.

4. Device as claimed in claim 2, characterized in that a liquid level detector is arranged above the measuring vessel.

5. Device as claimed in claim 1, characterized in that the measuring device comprises a liquid pressure gauge joined to the connection between the pump and solder tower.

6. Device as claimed in claim 2, characterized in that a connecting pipe including a narrowed portion is provided to connect the measuring vessel to the pump-solder tower connection.

7. Soldering apparatus comprising at least one solder tower, a pump and a connection therebetween, said apparatus further comprising a wave height measuring device including means to measure the liquid pressure in the connection between the pump and the solder tower.

8. Soldering apparatus as claimed in claim 7, characterized in that the soldering apparatus comprises a normal solder tower and a chip wave solder tower and that a wave height measuring device is arranged for each solder tower.

9. Soldering apparatus as claimed in claim 7, comprising means for controlling the capacity of the pump, characterized in that the wave height measuring device is connected to the means for controlling the capacity of the pump for at least momentary control of the wave height.

10. The soldering apparatus of claim 7, wherein the means for measuring the liquid pressure comprise a measuring vessel joined to the connection between pump and tower and communicating at its top with the atmosphere, the upper edge of which vessel is located higher than the outflow opening of the solder tower.

11. The soldering apparatus of claim 10, wherein the measuring vessel is widened at its upper end.

12. The soldering apparatus of claim 10, wherein a liquid level detector is arranged above the measuring vessel.

13. The soldering apparatus as claimed in claim 10, characterized in that the measuring device comprises a liquid pressure gauge joined to the connection between the pump and solder tower.

14. The soldering apparatus as claimed in claim 10, the measuring device includes a narrowed portion between the solder tower and the liquid pressure measuring means.

* * * * *